United States Patent [19]
Akashi

[11] Patent Number: 5,721,967
[45] Date of Patent: Feb. 24, 1998

[54] EQUIPMENT HAVING LINE OF SIGHT DETECTING MEANS

[75] Inventor: Akira Akashi, Yokohama, Japan

[73] Assignee: Canon Kabushiki Kaisha, Tokyo, Japan

[21] Appl. No.: 804,271

[22] Filed: Feb. 21, 1997

Related U.S. Application Data

[63] Continuation of Ser. No. 625,065, Mar. 29, 1996, abandoned.

[30] Foreign Application Priority Data

Mar. 30, 1995 [JP] Japan ............................ 7-095969

[51] Int. Cl.$^6$ ...................... G03B 13/02; G03B 13/36
[52] U.S. Cl. ...................... 396/51; 396/104; 396/123
[58] Field of Search ........................ 396/51, 104, 121, 396/123

[56] References Cited

U.S. PATENT DOCUMENTS

| | | | |
|---|---|---|---|
| 4,618,236 | 10/1986 | Akashi et al. | 354/406 |
| 4,716,282 | 12/1987 | Akashi et al. | 250/201 |
| 4,786,932 | 11/1988 | Akashi | 354/402 |
| 4,792,821 | 12/1988 | Akashi | 354/402 |
| 4,967,225 | 10/1990 | Akashi | 354/402 |
| 5,005,037 | 4/1991 | Akashi et al. | 354/400 |
| 5,012,267 | 4/1991 | Higashihara | 354/402 |
| 5,060,002 | 10/1991 | Ohnuki et al. | 354/402 |
| 5,061,951 | 10/1991 | Higashihara et al. | 354/400 |
| 5,061,953 | 10/1991 | Higashihara et al. | 354/402 |
| 5,126,777 | 6/1992 | Akashi et al. | 354/402 |
| 5,140,359 | 8/1992 | Higashihara et al. | 354/402 |
| 5,189,465 | 2/1993 | Akashi et al. | 354/408 |
| 5,293,194 | 3/1994 | Akashi | 354/402 |
| 5,296,888 | 3/1994 | Yamada | 354/402 |
| 5,311,241 | 5/1994 | Akashi et al. | 354/402 |
| 5,333,029 | 7/1994 | Uchiyama et al. | 354/410 |
| 5,402,199 | 3/1995 | Akashi | 354/410 |
| 5,486,892 | 1/1996 | Suzuki et al. | 354/402 |
| 5,515,130 | 5/1996 | Tsukahara et al. | 354/402 |

*Primary Examiner*—W. B. Perkey
*Attorney, Agent, or Firm*—Fitzpatrick, Cella, Harper & Scinto

[57] ABSTRACT

An equipment having a line of sight detection device includes a line of sight detection device for detecting a user's line of sight, a first detector for performing a focus detecting operation in a plurality of focus detection areas, a selector for selecting a specific focus detection area from among the plurality of focus detection areas on the basis of the line of sight detected by the line of sight detection device, a second detector for detecting any change in the focus state in the specific focus detection area at least from the result of the past focus detection in the specific focus detection area, and a determination device for determining a reliability of the specific focus detection area selected by the selecting device, on the basis of the change in the focus state detected by the second detector.

12 Claims, 11 Drawing Sheets

EQUIPMENT HAVING LINE OF SIGHT DETECTING MEANS

This application is a continuation of application Ser. No. 08/625,065, filed Mar. 29, 1996, now abandoned.

BACKGROUND OF THE INVENTION

1. Field of the Invention

This invention relates to an equipment having line of sight detection means for detecting a user's line of sight, and particularly verifies the reliability of the result of line of the sight detection.

2. Related Background Art

A camera is known in which a focus detecting operation is performed at a plurality of focus areas provided in a photographing image field and on the basis of the result of the detection, the focus adjustment of a photo-taking lens is effected.

Also, a system in which, when a moving object is to be photographed, focus adjustment is correctly effected with the movement of the object during a release time lag taken into account is called the "moving object anticipation mode servo auto focus", and is disclosed in detail in U.S. Pat. No. 5,012,267, U.S. Pat. No. 5,005,037, U.S. Pat. No. 5,060,002, etc.

There have also been proposed various cameras to which the focus detection at the above-mentioned plurality of focus areas and the moving object anticipation mode servo auto focus are applied, and some of them are disclosed in U.S. Pat. No. 5,140,359, for example.

Further, there have been proposed various cameras provided with a so-called line of sight detecting apparatus for detecting which position on the finder plane of the camera a user is gazing at.

For example, in applicant's U.S. Pat. No. 5,486,892, there is disclosed a camera in which the front eye part of a user's eyeball illuminated by an infrared light emitting diode (hereinafter, abbreviated as IRED) is photographed by the use of an area sensor and the image signal thereof is processed to thereby detect the coordinates of the user's line of sight on a finder and on the basis of the result of the detection, one of the plurality of focus areas or the plurality of photometry areas of the camera is selected.

A technique in which the result of the line of sight detection is applied to the selection of the focus detection area of the moving object anticipation mode servo auto focus having the above-mentioned plurality of focus areas is disclosed, for example, in U.S. patent application Ser. No. 08/141,615, and in this application, it is disclosed to effect the selection of the focus detection area on the basis of the sureness, i.e., the reliability, of the result of the line of sight detection and the result of the focus detection.

In the case of such a method, however, the selection of the focus detection area depends on the reliability of the result of the line of sight detection and therefore, even if an original main object does not exist in that focus detection area, that focus detection area will be selected, and this gives rise to the problem that the camera is not focused on the main object.

SUMMARY OF THE INVENTION

One aspect of the invention is to determine the reliability of a selection of a focus detection area a user has selected by his or her line of sight, on the basis of a change in the focus state in said focus detection area.

One aspect of the invention is to select, when the reliability of the selection of a focus detection area selected by the line of sight is low, an appropriate focus detection area on the basis of a change in the focus state in said focus detection area.

One aspect of the invention is to retain a focus detection area selected by the line of sight when the user continues to select a specific focus detection area by his or her line of sight even if it is determined that the reliability of the selection of the focus detection area selected by the line of sight is low.

DESCRIPTION OF THE PREFERRED EMBODIMENTS

Figure 1:
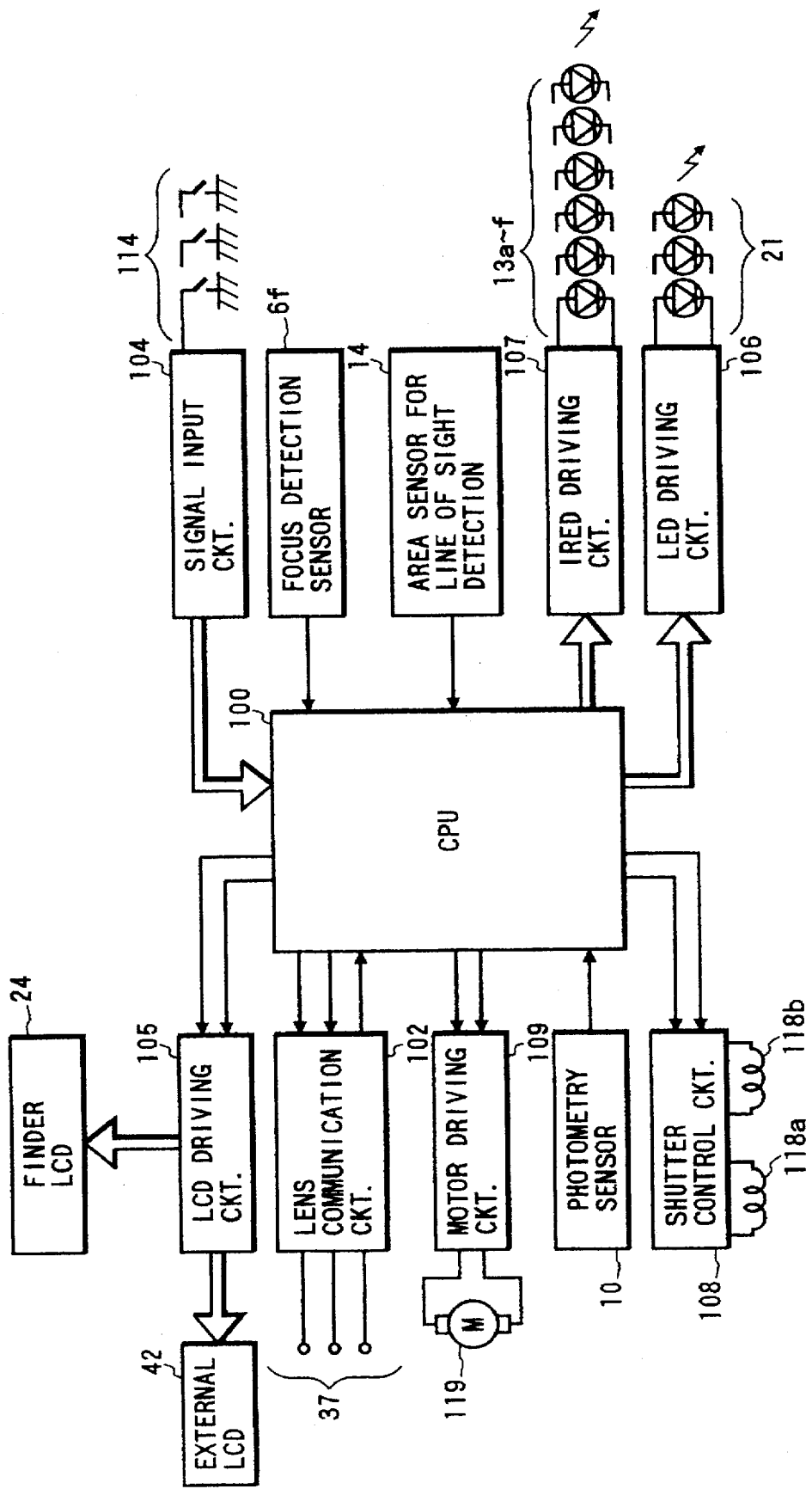
FIG. 1 is a block diagram showing the essential portions of a camera having a line of sight detecting device in an embodiment of the present invention.

The invention will hereinafter be described with respect to some embodiments thereof shown in the drawings.

Figure 2:
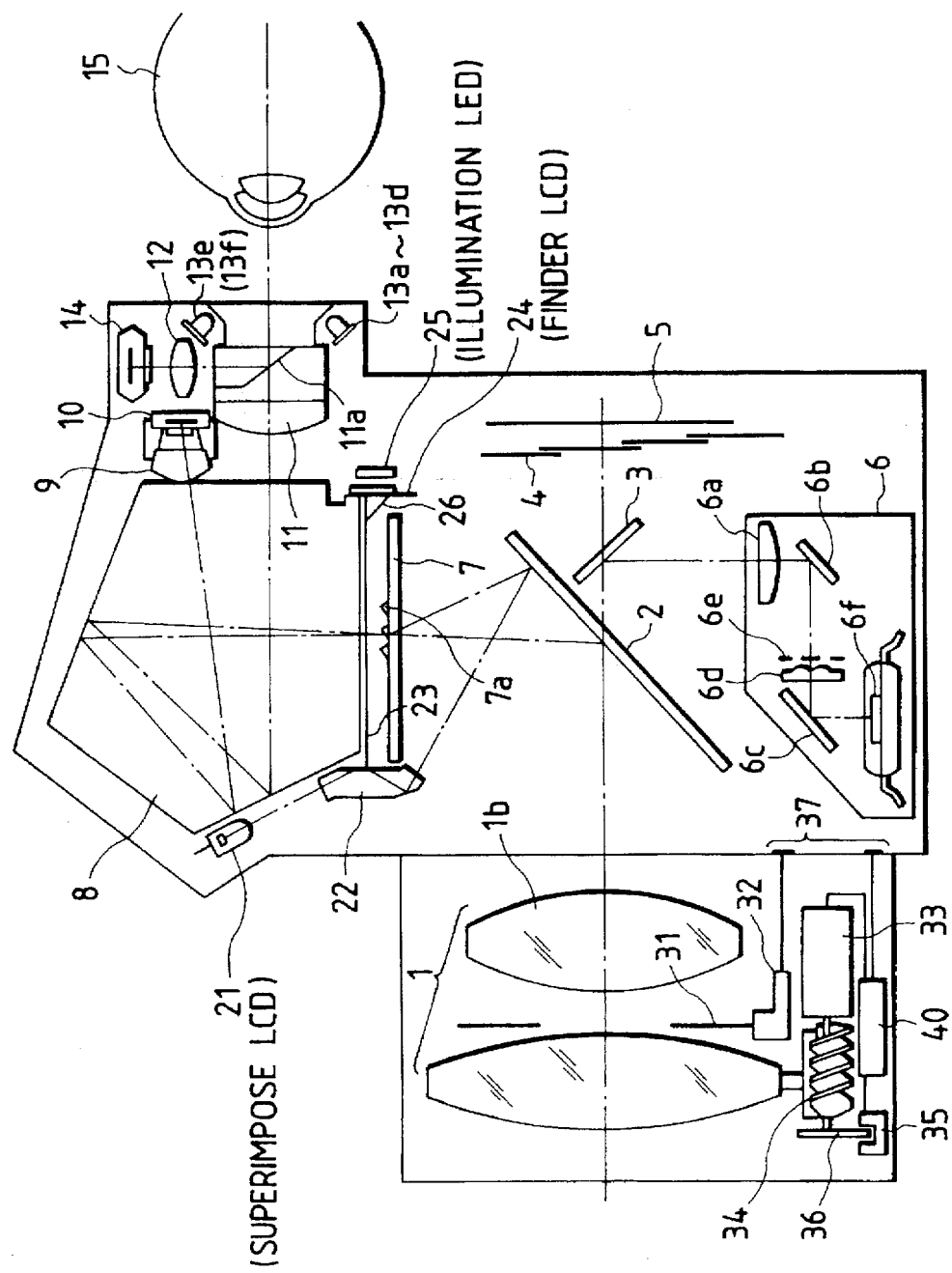
FIG. 2 is an optical arrangement view showing the essential portions of a camera having a line of sight detecting device in an embodiment of the present invention.

FIG. 2 is an optical arrangement view showing the essential portions of a camera having a line of sight detecting function according to an embodiment of the present invention, and shows a case wherein the present invention is applied to a single-lens reflex camera.

In FIG. 2, the reference numeral 1 designates a photo-taking lens, which is shown as comprising two lenses for the sake of convenience, but actually is comprised of a number of lenses. The reference numeral 2 denotes a main mirror which is obliquely provided in or retracted from a photo-taking optical path to thereby change over the observed state and the photographed state of an object image by a finder system. The reference numeral 3 designates a sub-mirror which reflects part of a beam of light transmitted through the main mirror 2 toward a focus detecting unit 6 below a camera body. The reference numeral 4 denotes a shutter, and the reference numeral 5 designates a photosensitive member which may be a silver salt film, a solid state image pickup element of the CCD or MOS type or the like, or an image pickup tube such as a vidicon.

The reference numeral 6 denotes a focus detecting unit comprised of a field lens 6a disposed near an imaging plane, reflecting mirrors 6b and 6c, a secondary optical system 6d, an aperture 6e, a line sensor 6f, etc. A focus detecting apparatus in this embodiment uses a well-known phase difference detecting system, and can detect the focus state of three different focus detection areas in an image field.

Figure 3:
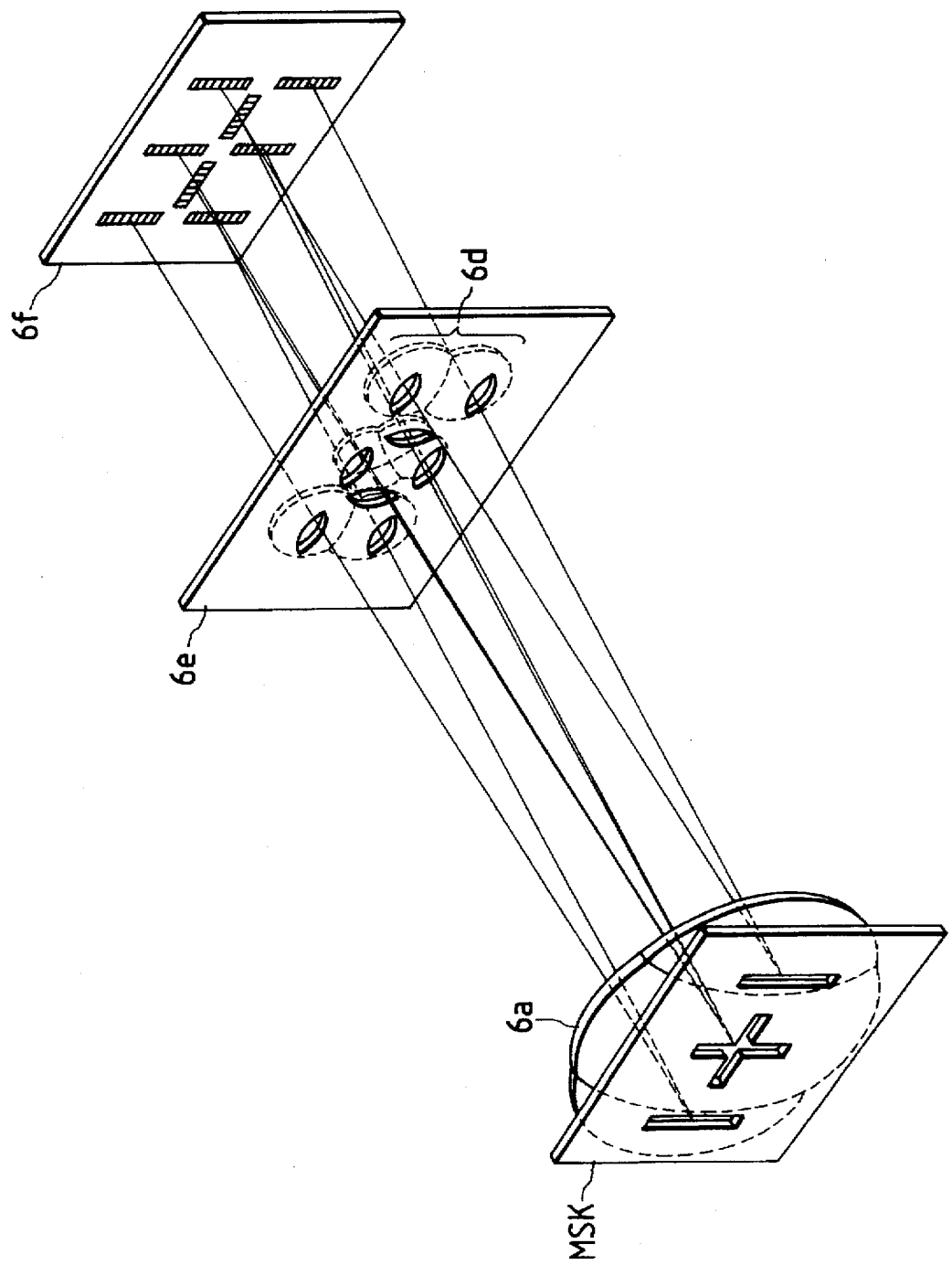
FIG. 3 is a perspective view showing the optical arrangement of a focus detecting apparatus provided in a camera having a line of sight detecting device in an embodiment of the present invention.

The construction of the focus detecting apparatus is shown in FIG. 3.

A beam of light from an object reflected by the sub-mirror 3 is imaged near a field mask MSK in FIG. 3. This field mask MSK is a light intercepting member which determines a focus detection area in the image field, and has a cruciform opening portion at the center thereof and two vertically long opening portions on the opposite sides thereof.

Three lenses forming the field lens 6a correspond to the three opening portions of the field mask MSK. The aperture 6e is disposed rearwardly of the field lens 6a, and has two vertical pairs of opening portions provided at the center thereof and a pair of opening portions provided in the right and left marginal portions thereof. Also, the field lens 6a has the action of imaging the opening portions of the aperture 6e near the exit pupil of the photo-taking lens 1.

The secondary optical system 6d is provided rearwardly of the aperture 6e and comprises four pairs of lenses, which correspond to the respective opening portions of the aperture 6e.

Beams of light passed through a field mask 23, the field lens 6a, the aperture 6e and the secondary optical system 6d are imaged on four pairs of sensor arrays on a focus detection sensor 6f. The images on each pair of sensor arrays are photoelectrically converted and the relative positional displacement of four pairs of image signals is detected, whereby the focus state of focus detection areas at a total of three locations on the image field, i.e., a location in two vertical and horizontal directions in the central portion and two marginal locations can be detected.

In the present embodiment, hereinafter, the central focus detection area will sometimes be referred to as the "center focus area", the focus detection areas at the two marginal locations will sometimes be referred to as the "right focus area" and the "left focus area", respectively, and further, the focus detection areas at locations including the marginal locations will sometimes be referred to as the "peripheral focus areas". The center focus area is typified by being an area that in one of the two vertical and horizontal directions in which the reliability of the result of detection is higher.

The details of such a focus detecting system are described in detail, for example, in U.S. Pat. No. 5,189,465 and therefore, need not be described any further.

Turning back to FIG. 2, the reference numerals 7 and 8 designate a well-known focusing plate and a pentagonal prism, respectively, and the reference numerals 9 and 10 denote an imaging lens and a photometry sensor, respectively, for measuring the luminance of the object in an observation image field. The imaging lens 9 relates the focusing plate 7 and the photometry sensor 10 to each other conjugated with each other through a reflecting optical path in the pentagonal prism 8.

An eyepiece 11 provided with a beam splitter 11a is disposed rearwardly of the exit surface of the pentagonal prism 8 and is used for the observation of the focusing plate 7 by a user's eye 15. The beam splitter 11a comprises, for example, a dichroic mirror transmitting visible light therethrough and reflecting infrared light.

The reference numeral 12 designates a light receiving lens, and the reference numeral 14 denotes an area sensor comprising a photoelectric element such as a CCD disposed two-dimensionally. The area sensor 14 is disposed so as to be conjugate with the vicinity of the pupil of the user's eye 15 lying at a predetermined position with respect to the light receiving lens 12. The reference characters 13a–13f designate six IREDs which are illuminating light sources.

The eyepiece 11, the light receiving lens 12, the IREDs 13a–13f and the area sensor 14 form the constituents of line of sight detecting means in the present embodiment, together with a CPU 100 which will be described later.

The reference numeral 21 denotes a finder superimposed LED, and light emitted therefrom passes through a light projection prism 22, is reflected by the main mirror 2, is bent in a vertical direction by a microprism group 7a provided on the display portion of the focusing plate 7, and passes through the pentagonal prism 8 and the eyepiece 11 to the user's eye 15. So, the microprism group 7a is formed into a frame-like shape at locations on the focusing plate 7 which correspond to the plurality of focus detection areas, and this is illuminated by three superimposed LEDs 21 corresponding thereto. Thereby, three focus area marks which will be described later shine in the field of view of the finder and the focus detection areas (focus areas) can be displayed.

The reference numeral 23 designates a mask forming the field of view of the finder, and the reference numeral 24 denotes an LCD in the lower portion of the finder for displaying photographing information outside the field of view of the finder. The LCD 24 is illuminated from behind it by an illumination LED 25.

The light transmitted through the LCD 24 is directed into the field of view of the finder by a triangular prism 26, and is displayed in the lower portion of the field of view of the finder as indicated at 24 in FIG. 4 which will be described later and thus, the user can know the photographing information.

Figure 4:
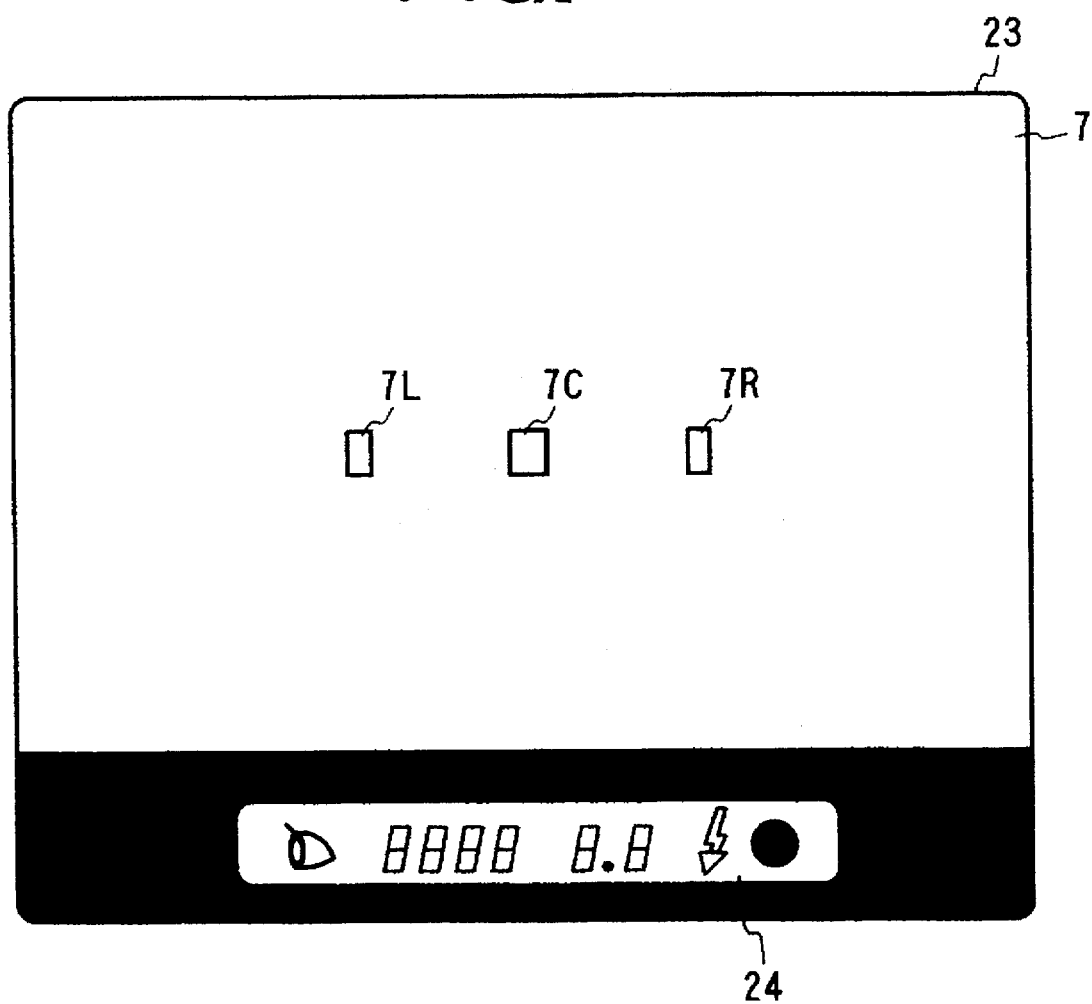
FIG. 4 shows the interior of the finder of a camera having a line of sight detecting device in an embodiment of the present invention.

FIG. 4 shows the field of view of the finder.

There are three focus detection area (focus area) marks 7C, 7R and 7L in the photographing field of view 7 on the focusing plate limited by the finder field mask 23. These focus area marks are microprisms formed on the focusing plate as previously described, and are illuminated by the superimposed LED 21.

There is the LCD 24 in the lower portion of the finder, and there are disposed the in-focus display of the focus detecting apparatus of the camera, a flash device charging completion display and a shutter speed value (Tv) and an aperture value (Av) comprising a 7-segment display, and a line of sight mark.

Turning back again to FIG. 2, the reference numeral 31 denotes an aperture provided in the photo-taking lens, the reference numeral 32 designates an aperture driving device, the reference numeral 33 denotes a lens driving motor, and the reference numeral 34 designates a lens driving member comprising a drive gear or the like. The reference numeral 35 denotes a photointerrupter which detects the rotation of a pulse plate 36 operatively associated therewith by the lens driving member 34 and transmits it to a focus optical system driving circuit 40, which in turn drives the lens driving motor by a predetermined amount on the basis of this information and the information of the lens drive amount sent from the camera side so as to move the photo-taking lens 1 to the in-focus position. The reference numeral 37 designates a mount contact which is the interface between a conventional camera and a lens.

FIG. 1 is a block diagram showing the electrical construction of the camera of the above-described construction, and in FIG. 1, the same elements as those in FIG. 2 are given the same reference numerals.

A microcomputer (hereinafter referred to as the CPU) 100 has connected thereto the area sensor 14 for line of sight detection, the photometry sensor 10, the focus detection sensor 6f, a signal input circuit 104, an LCD driving circuit 105, an LED driving circuit 106, an IRED driving circuit 107, a shutter control circuit 108 and a motor driving circuit 109. Also, the transmission of signals such as focus adjustment information and aperture control information is done to the photo-taking lens by way of a lens communication circuit 102 through the mount contact 37 shown in FIG. 2.

The details of the photometry sensor 10, the shutter control circuit 108, the motor driving circuit 109 and the lens communication circuit 102 have no direct relation to the present invention and therefore need not be described any further.

In the CPU 100, there are contained a ROM storing therein a program for controlling the operation of the camera, a RAM for storing a variable therein, and an EEPROM (electrical erasable and programmable read only memory) for storing various parameters therein.

The area sensor 14 for line of sight detection photoelectrically converts the image of the user's eyeball formed on the surface of the sensor by an optical system for line of sight detection (the eyepiece 11 and light receiving lens 12 of FIG. 2), and transmits the electrical signal to the CPU 100. The CPU 100 A/D-converts the transmitted electrical signal and stores the image data into the RAM. Further, the CPU 100 signal-processes the data in accordance with a predetermined algorithm stored in the ROM, and calculates the user's line of sight.

The signal input circuit 104 is a circuit which transmits the states of the switches 114 of the camera to the camera, and the switches 114 include a switch adapted to be closed by first and second strokes of a release button, not shown, and a switch for setting the various states of the camera.

The LED driving circuit 106 controls the aforedescribed superimposed LEDs 21 and finder illuminating LED 25. The IRED driving circuit 107 controls the IREDs 13a–13f for line of sight detection.

The LCD driving circuit 105 can cause the external LCD 42, not shown, disposed outside the camera and the LCD 24 disposed in the lower portion of the finder to display an aperture value, a shutter speed value or a set photographing mode or the like in accordance with the instructions from the CPU 100.

The operation of the camera constructed as described above will now be described with reference to the flow charts of FIG. 8 and so on.

By the release button being depressed, the camera starts a series of operations.

Figure 8:
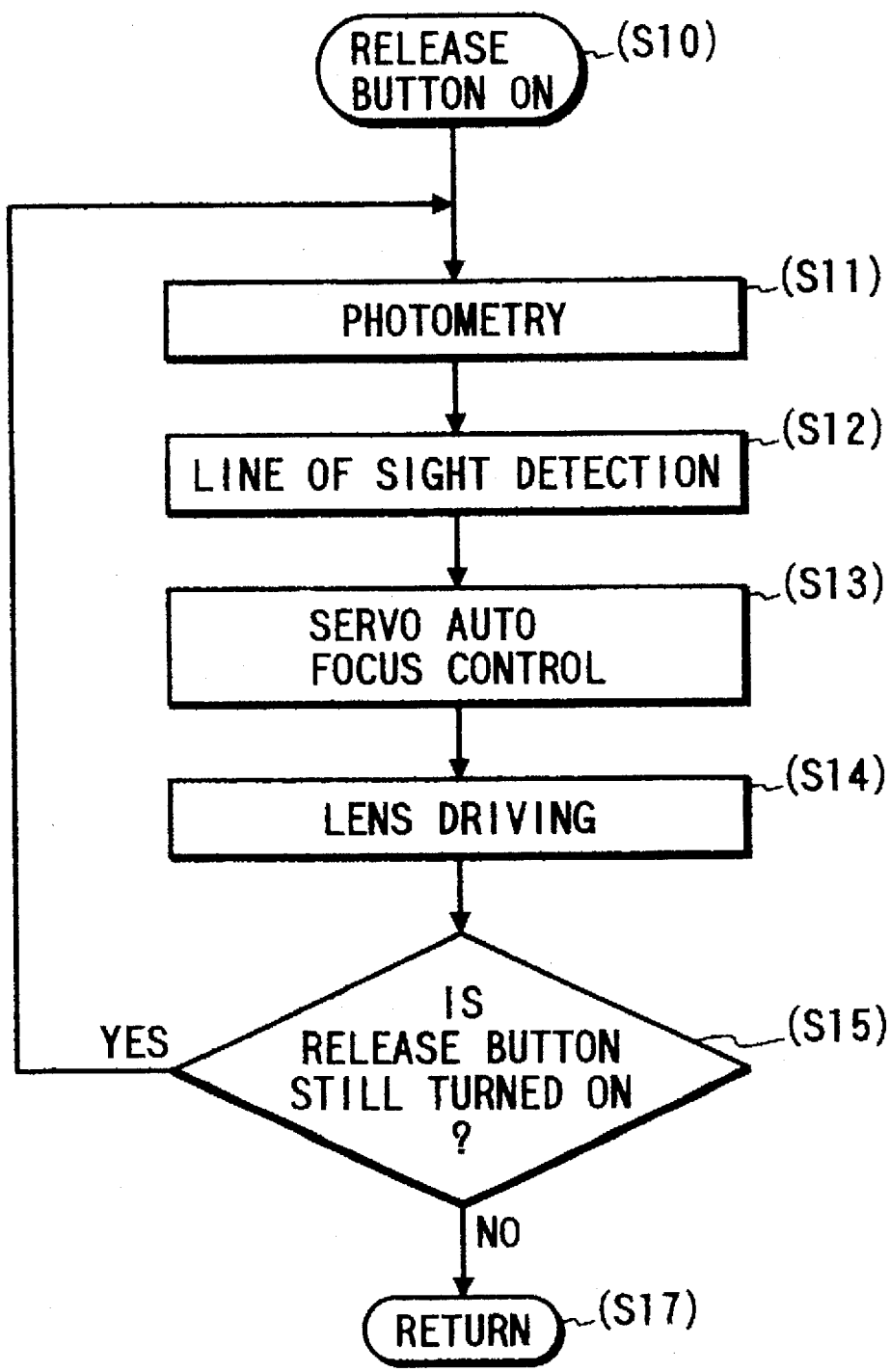
FIG. 8 is a flow chart showing the series of operations of a camera having a line of sight detecting device in an embodiment of the present invention.

Via the step 10 of FIG. 8 (in the flow of FIG. 8, etc., S10), the CPU 100 first executes the photometry operation at a step 11. Subsequently, at a step 12, it executes the line of sight detecting operation and detects the user's line of sight.

The specific line of sight detecting operation here is disclosed in detail in U.S. patent application Ser. No. 08/442,570 and U.S. Pat. No. 5,402,199 and therefore need not be described in detail herein, yet the approximate operation is performed as follows.

An appropriate pair of the IREDs 13a–13f is turned on by the IRED driving circuit 107 to thereby illuminate the user's eyeball. In this state, the area sensor 14 for line of sight detection is caused to integrate an electrical change for a predetermined time. After the integration, the selected pair of IREDs is turned off and the CPU 100 sequentially reads an eyeball image signal from the area sensor 14, A/D-converts it and stores into it the RAM. Thereafter, the eyeball image signal stored in the RAM is processed by a conventional method to thereby detect the rotation angle of the user's eyeball. The correction of an individual difference is effected by the use of the detected rotation angle of the eyeball and individual difference correction data stored in memory means (EEPROM), and the user's line of sight, i.e., the coordinates of the line of sight on the finder, are calculated.

When the line of sight information is obtained, or even if the detection of the line of sight fails, at the next step 13, one of the focus detection areas is selected and a subroutine "servo AF control" for controlling the servo auto focus operation is executed.

The subroutine "servo AF control" will be described later in detail, and when the driving amount of the photo-taking lens is determined in the same subroutine, lens driving is executed at the next step 14.

At the next step 15, the state of the release button of the camera is detected and if it is still ON, the program branches off to the step 11 to repeat the operations of the step 11 and subsequent steps.

On the other hand, if the release button is already OFF, the servo auto focus operation is terminated at a step 17.

Figure 9:
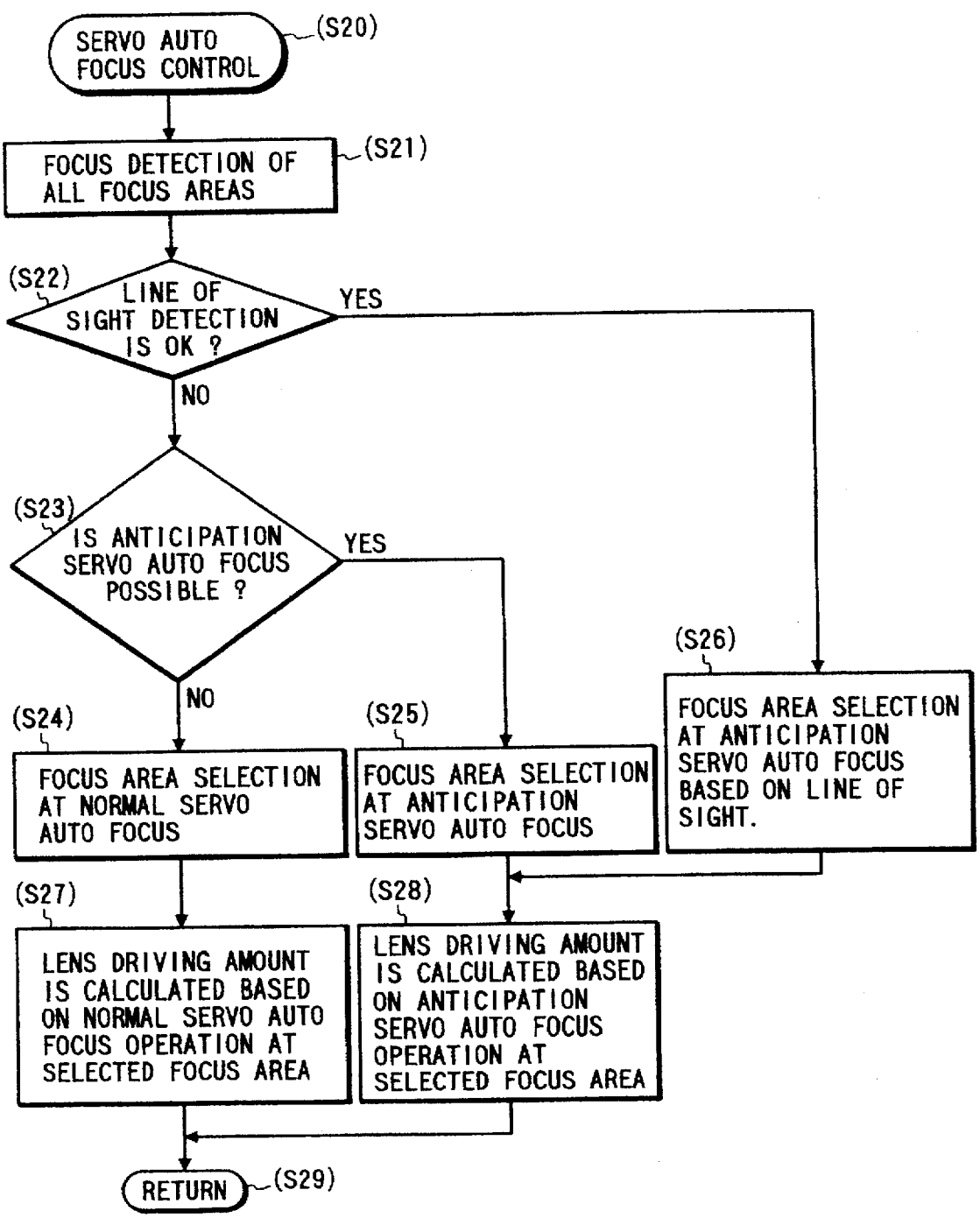
FIG. 9 is a flow chart showing the operation during the "servo auto focus control" of FIG. 8.

FIG. 9 is a flow chart of a subroutine "servo AF control" for controlling the servo auto focus operation.

When this subroutine is called at the step 13 of FIG. 8, the focus detection of three focus areas is executed at a step 21 by way of a step 20. A specific method of focus detection is disclosed in U.S. Pat. No. 5,189,465, and more particularly, in U.S. Pat. No. 5,126,777 and therefore, need not be described in detail herein.

At the next step 22, whether the line of sight detection of the step 12 has been successful is judged, and if the line of sight detection indicates a failure, whether the anticipation servo auto focus operation is possible is judged at a step 23.

This anticipation servo auto focus, as is also described in U.S. Pat. No. 5,012,267, is a method of anticipating the moving amount of the imaging plane in the future on the basis of the continuous focus state at a plurality of times in the past, and effecting the lens driving. For example, the moving amount of the imaging plane of an object coming closer is represented as a curve d shown in FIG. 6.

Accordingly, if focus detection was impossible during the first focus detection after the release button was depressed or in the past, the information for anticipating a future change in the moving amount of the imaging plane will become deficient and anticipation servo cannot be executed. Such a judgment is effected at the step 23.

Now, if at the step 23, it is judged that the anticipation servo auto focus operation is impossible, a shift is made to a step 24, where a subroutine "focus area selection at normal servo auto focus operation" is executed. Also, if it is judged that the anticipation servo auto focus operation is possible, a shift is made to a step 25, where a subroutine "focus area selection at anticipation servo auto focus operation" is executed.

On the other hand, if at the step 22, the line of sight detection is successful and the user's line of sight can be found, a subroutine "focus area selection at anticipation servo auto focus operation based on line of sight" is executed to execute the servo auto focus operation using the line of sight information.

Subroutines "focus area selection at normal servo auto focus operation", "focus area selection at anticipation servo auto focus operation" and "focus area selection at anticipation servo auto focus operation based on line of sight" for selecting focus areas at servo AF will be described later, and when a focus area is selected in each subroutine, the driving amount of the photo-taking lens is calculated on the basis of the focus information of the focus area selected at a step 27 or a step 28. Particularly, in the case of the anticipation servo auto focus of the step 28, it is necessary to anticipate the movement of the object in the future on the basis of the focus information at several times in the past and calculate the driving amount of the lens. The specific content of this calculation is described in detail in U.S. Pat. No. 5,012,267.

When the calculation of the driving amount of the lens at the step 27 or the step 28 is terminated, the subroutine "servo auto focus control" is terminated at a step 29.

Figure 10:
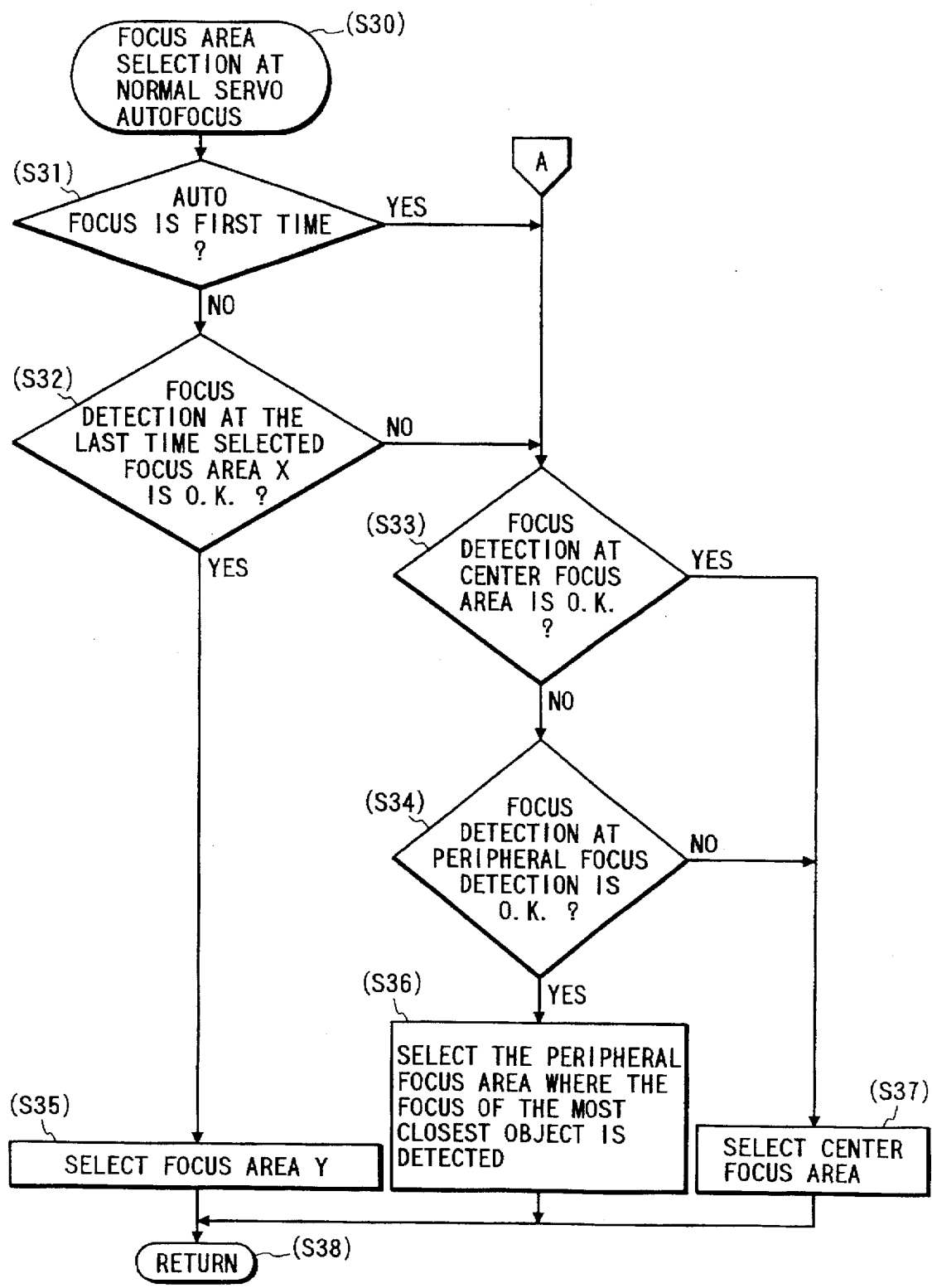
FIG. 10 is a flow chart showing the operation during the "focus area selection at normal servo auto focus" of FIG. 9.

FIG. 10 shows a flow chart of the subroutine "focus area selection at normal servo auto focus operation" at the step 27 of FIG. 9.

Whether the auto focus operation is the first time is judged at a step 31 via a step 30, and if it is not the first time, whether the focus area X selected at the last time is O.K. (focus detection possible) in the focus detection at this time is judged at the next step 32. This judgment is done generally on the basis of the contrast of the image signal, the amount of correlation obtained in the correlative calculation process in the phase difference detection system, etc. If the focus detection of the focus area X is successful (O.K.) this time, the focus area selected this time is determined as the focus area X at a step 35.

If, at the step 31, it is judged that the auto focus operation is the first time or at the step 32, it is judged that the focus area X at the last time is not O.K. in the focus detection this time, there is no reason for determining the focus area this time and therefore, the most appropriate focus area is selected in the flow of a step 33 and subsequent steps.

That is, if at the step 33, the focus detection of the center focus area is O.K., a shift is made to a step 37, where the center focus area is determined.

As regards the center focus area, if focus detection could not be done, whether the two peripheral focus areas except the center are O.K. for focus detection is judged at the step 33, and if the focus detection of the peripheral focus areas could not be done, there is no other selecting method and therefore, at a step 37, the center focus area is determined.

If the peripheral focus areas are O.K. for focus detection, a shift is made to a step 36, where the focus area catching the closest object in the peripheral focus area for which focus detection is O.K. is determined as a selected focus area. For that, the focus area presenting the back focus most in the detected defocus amounts of the respective focus areas can be selected.

The focus area selection at the normal servo auto focus operation described above may be briefly summed up as follows.

(1) If the focus area selected the last time is O.K. for focus detection this time, that focus area is also selected this time.

(2) If the focus area selected at the last time cannot be selected this time, the center focus area in which the probability of the presence of the main object is highest is selected.

(3) If the center focus area cannot be selected, the focus area in which the closest object is present is selected.

(4) If all focus areas cannot be focus-detected this time, the center focus area is tentatively selected.

The subroutine "focus area selection at anticipation servo auto focus operation" at the step 25 of FIG. 9 will now be described with reference to the flow chart of FIG. 11.

At a step 41 via a step 40, the latest focus detection state of the focus area X selected at the last time is judged as in "focus area selection at normal servo auto focus operation". If the focus area X is O.K. for the focus detection this time, the continuity of the moving amount of the imaging plane of the focus area X is judged at the next step 42.

Here, the continuity of the moving amount of the imaging plane will be described with reference to FIG. 6.

When the object is a moving object, the moving amount of the imaging plane thereof smoothly varies as indicated by curve d. The moving speed of the imaging plane is the moving amount per unit time, i.e., the gradient of this curve.

Figure 6:
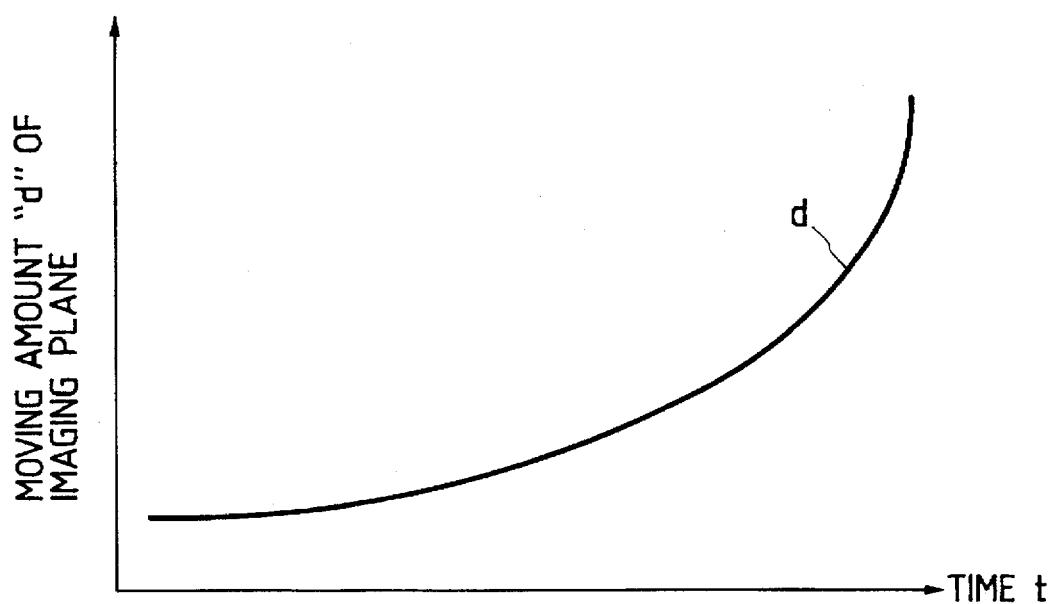
FIG. 6 is a graph for illustrating the moving amount of the imaging plane of an object in an embodiment of the present invention.

If, in the focus detecting operation, a focus area catches the same object, the moving amount of the imaging plane that focus area observes becomes smooth, like the curve d of FIG. 6.

Figure 5A:
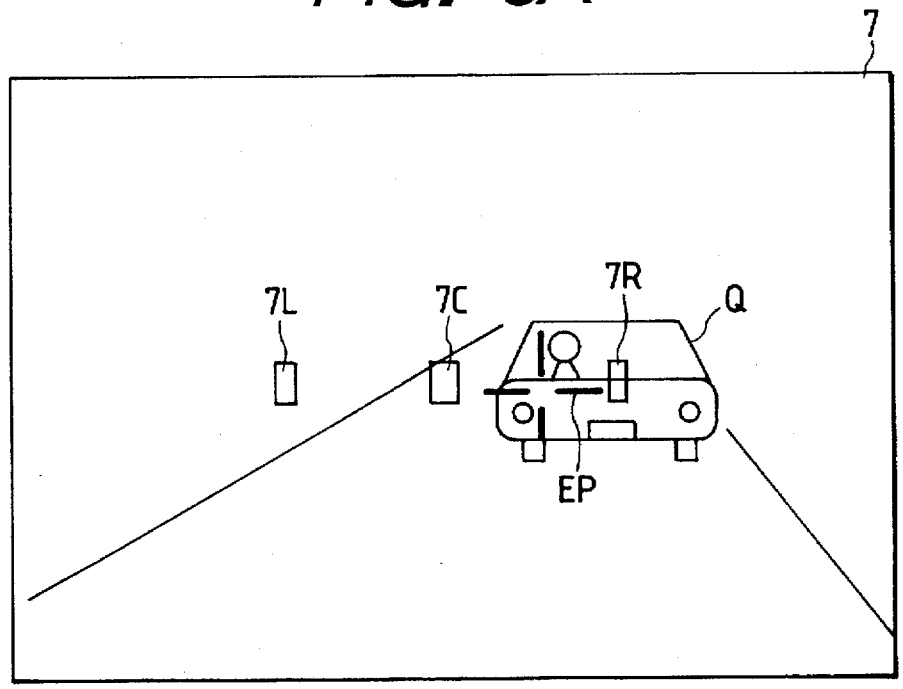
FIGS. 5A and 5B show examples of the field of view of the finder in an embodiment of the present invention.
Figure 5B:
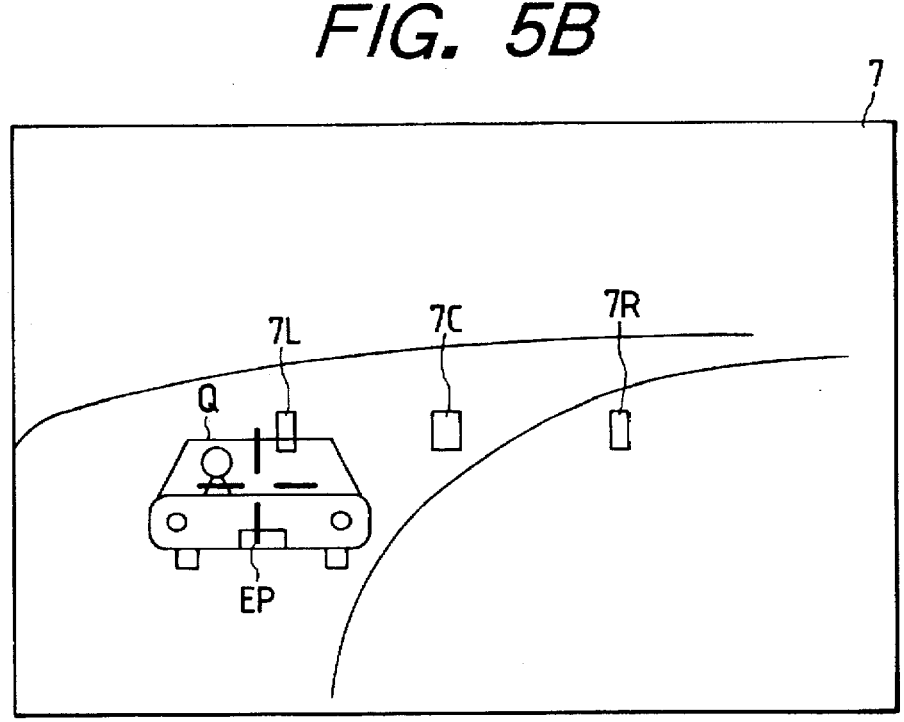

However, if the same object goes between a plurality of focus areas, the curve of the moving amount of the imaging plane will become discontinuous. FIGS. 5A and 5B schematically show that state.

FIG. 5A represents a state in which, within the finder 7, an object Q (e.g., a vehicle) is caught in the right focus area 7R and the background is caught in the center focus area 7C and the left focus area 7L. Let it be assumed that, in this state, the auto focus operation is continued and at a time ta, the position of the object Q has shifted from the right focus area 7R to the left focus area 7L as shown in FIG. 5B. The variation in the moving amount of the imaging plane each focus area observes in such a situation is shown in FIG. 7.

Figure 7:
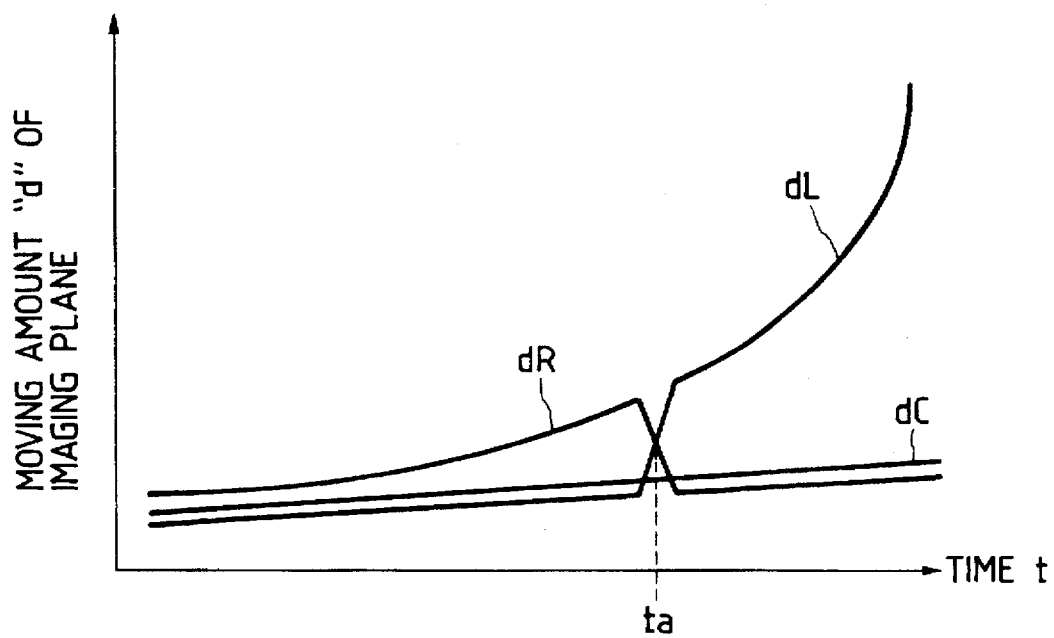
FIG. 7 is a graph for illustrating the moving amount of the imaging plane of an object in an embodiment of the present invention.

The curves dR, dC and dL of FIG. 7 indicate the moving amounts of the imaging plane the right focus area, the center focus area and the left focus area, respectively, observes. Until a time ta, it is only the right focus area that catches the object Q and therefore, only the curve dR increases smoothly and monotonously. The center focus area and the left focus area catch the background such as a road and therefore, there is very little variation in the moving amounts dC and dL of the imaging plane.

When, at the time ta, the object Q shifts from the right focus area to the left focus area, the moving amounts dR and dL of the imaging plane become such as shown in FIG. 7 with the time ta as the boundary, and the moving amount of the imaging plane of the object Q itself changes in such a manner as to be dR before the time ta and dL after the time ta.

Figure 11:
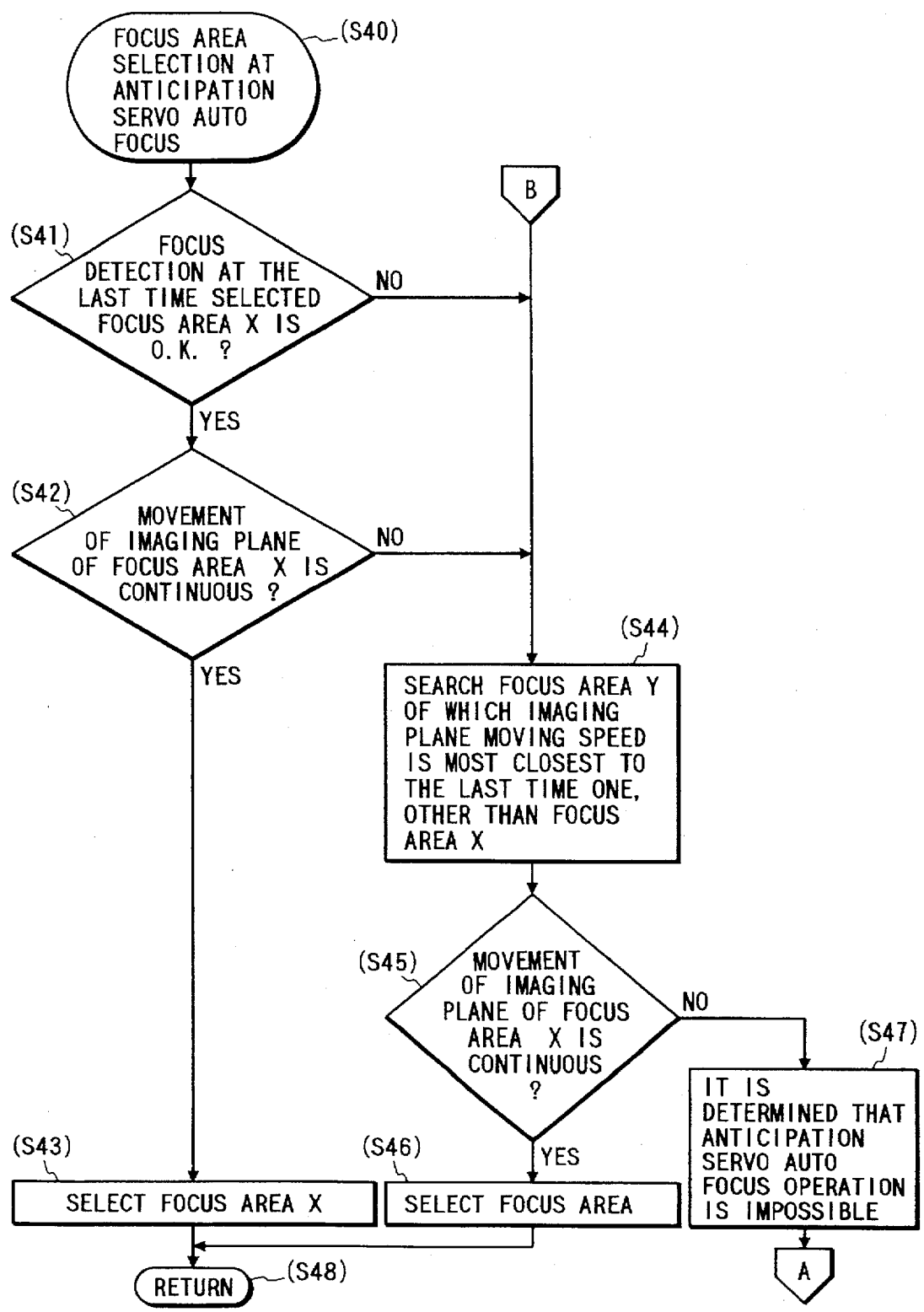
FIG. 11 is a flow chart showing the operation during the "focus area selection at anticipation servo auto focus" of FIG. 9.

At the step 42 of FIG. 11, the judgment of the continuity of such a moving amount of the imaging plane is done. Specifically, the moving speed of the imaging plane of the selected focus area until the last time is compared with the moving speed of the imaging plane of the focus area which is the candidate this time, and if it does not greatly vary, it is determined that there is a continuity.

Actually, the focus detecting operation is performed at predetermined time intervals and therefore, assuming that the moving amount of the imaging plane at a discrete time $t(i)$ is $d(i)$, the moving speed $v(i)$ of the imaging plane at the time $t(i)$ can be expressed as $$v(i)=[d(i)-d(i-1)]/[t(i)-t(i-1)].$$

As regards the judgment of a change in the continuity, when, with attention paid to the difference in speed, the condition that $|v(i)-v(i-1)|<vth$ is satisfied, it can be judged that "there is a continuity", or when, with attention paid to the ratio of speed, the condition that $vthr1 < v(i)/v(i-1) < vthr2$ is satisfied, it can be judged that "there is a continuity". In any case, it is premised that the object, which is the subject of judgment, is a moving object and therefore, it is desirable to pay attention not to the moving amount itself of the imaging plane, but to the moving speed.

Now, in the case of FIG. 7, before the time ta, the focus area selected at the last time is the right focus area and the moving amount of the imaging plane thereof is dR and the focus area which is the candidate this time is the right focus area, as was the case the last time, and therefore, the changes in the moving speed of the imaging plane at the last time and this time are small, and it is determined that there is a continuity.

However, when at the time ta, the continuity is judged around ta, the focus area selected at the last time is the right focus area, the moving amount of the imaging plane is dR and the candidate this time is the right focus area. Therefore, the moving speed of the imaging plane greatly changes and in this case, it is determined that there is no continuity.

Turning back to FIG. 11, if, for example, as before the time ta in the case of FIG. 7, it is determined that there is a continuity in the focus area X selected at the last time (in the case of FIG. 7, the right focus area), at a step 43, the focus area X selected at the last time is determined as the focus area to be selected this time.

If, at the step 41, it is determined that focus detection cannot be done for the focus area X or at the step 42, it is determined that there is no continuity in the focus area X, the focus area X cannot be selected this time and therefore, a shift is made to a step 44, where a focus area, in which the focus area selected at the last time and the moving speed therefrom match the determination criterion of the above-described continuity most, from the viewpoint of the continuity of the moving amount of the imaging plane, is searched.

Specifically, of the other focus areas than the focus area X, a focus area Y in which $|vY(i)-vX(i-1)|$ is smallest or $vY(i)/vX(i-1)$ is most appropriate to 1 is searched. In the foregoing, $vX(i-1)$ is the last moving speed of the imaging plane of the focus area X selected at the last time, and $vY(i)$ is the current moving speed of the imaging plane of the focus area Y.

In the example of FIG. 7, the moving amount dR of the imaging plane of the right focus area becomes discontinuous at the time ta, but after the time ta, the moving amount dL of the imaging plane of the left focus area is continuous to dR, and at the step 44, a focus area like that can be searched.

Now, at a step 45, the thus searched focus area Y is determined as to its continuity as at the step 42. The difference of the step 45 from the step 42 is that the focus area to be compared is a different focus area.

Mathematically expressing, when the condition that $|vY(i)-vX(i-1)|<vth$ is satisfied, it is determined that "there is a continuity", or when the condition that $vthr1 < vY(i)/vX(i-1) < vthr2$ is satisfied, it is determined that "there is a continuity".

If, at the step 45, it is determined that there is a continuity in the focus area Y, at the next step 46, the focus area to be selected this time is determined as the focus area Y.

If, at the step 43 or a step 46, the focus area to be selected this time is determined, a subroutine "focus area selection at anticipation servo auto focus operation" is terminated at a step 48.

If, at the step 45, a new focus area could not be found out from the viewpoint of the continuity of the moving amount of the imaging plane, at a step 47, it is determined that the anticipation servo auto focus operation is impossible, and by way of a terminal A, the program branches off to the step 33 in the flow chart of the subroutine "focus area selection at normal servo auto focus operation" of FIG. 11, where focus area selection not resorting to the anticipation servo auto focus operation is done.

The focus area selection by the above-described anticipation servo auto focus operation may be briefly summed up as follows.

(1) If the focus area selected at the last time is O.K. for focus detection this time and there is a continuity in the moving amount of the imaging plane thereof, that focus area is also selected this time.

(2) If the focus area selected at the last time cannot be selected this time, a focus area in which there is the continuity of the moving amount of the imaging plane is selected.

(3) If a focus area in which there is the continuity of the moving amount of the imaging plane cannot be found out this time, it is determined that the anticipation servo auto focus operation is impossible, and a focus area appropriate as the normal servo auto focus operation is selected.

In reality, however, there is a case where the continuity of the moving amount of the imaging plane is observed to a certain degree also in the other focus areas than the focus area in which the main object is present, and simply by a change in the moving speed of the imaging plane, it is not always possible to change over to the optimum focus area conveniently. In such a case, the support of the focus area selection by line of sight information would be effective.

Figure 12:
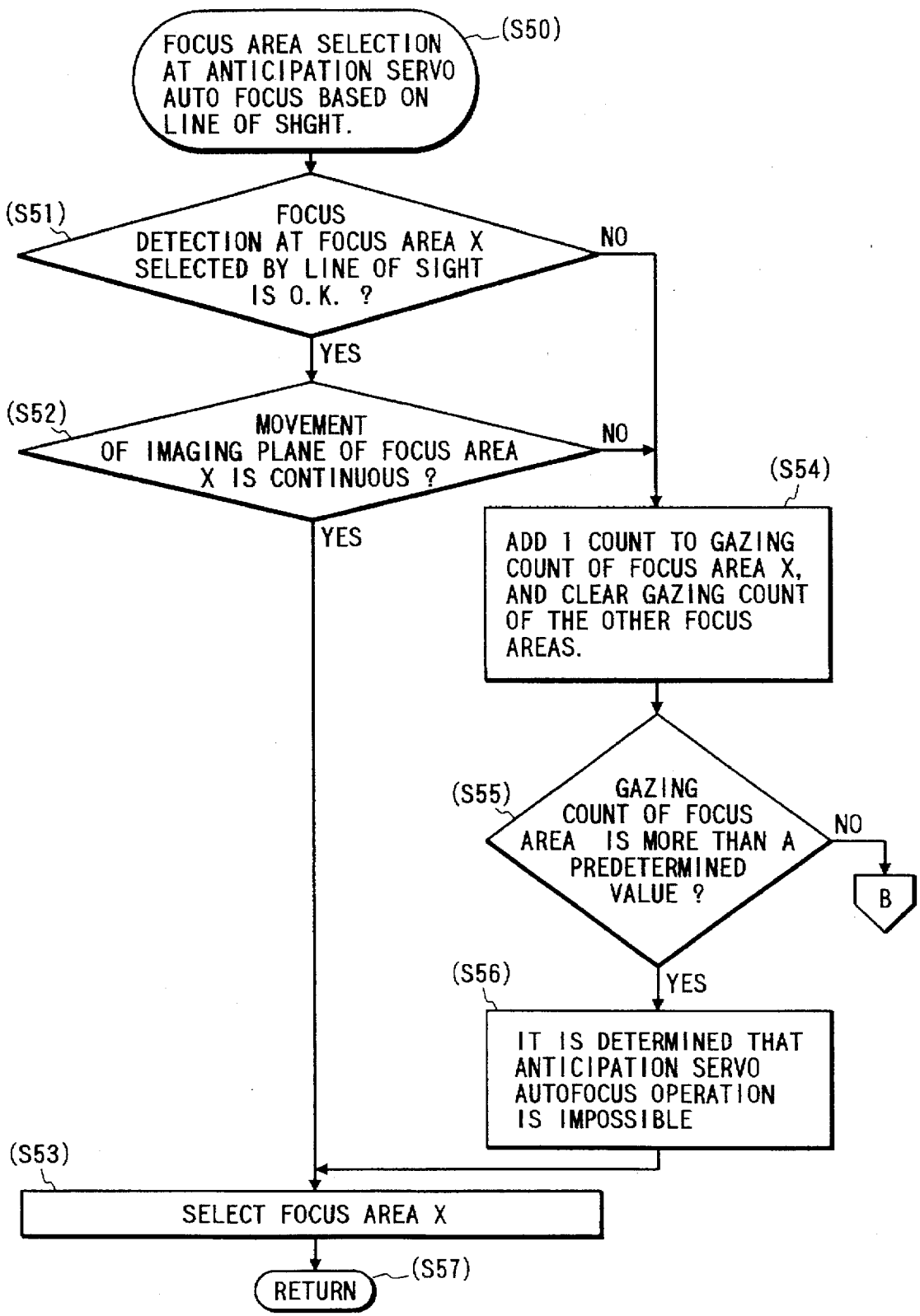
FIG. 12 is a flow chart showing the operation during the "focus area selection at anticipation servo auto focus based on line of sight" of FIG. 9.

The subroutine "focus area selection at anticipation servo auto focus operation based on line of sight" will now be described with reference to the flow chart of FIG. 12.

At a step 51 by way of a step 50, the focus detection state of the focus area X selected by the line of sight is judged. This focus area X is a focus area lying at a position nearest to the coordinates of the user's line of sight on the finder. If focus detection is O.K. at the focus area X, at the next step 52, the continuity of the moving amount of the imaging plane of the focus area X is determined as at the step 42 of the subroutine "focus area selection at anticipation servo auto focus operation".

If, it is determined that there is a continuity in the focus area X, at a step 53, the focus area X is determined as a focus area to be selected this time.

If, at the step 51, it is determined that the focus area X cannot be focus-detected, or at the step 52, it is determined that there is no continuity in the focus area X, a shift is made to a step 54. At this step 54, 1 count is added to the "gazing count" of the focus area X. At the same time, the "gazing count" of any other focus area than the focus area X is cleared.

The "gazing count" prepared for each focus area is a count representing how many times on end the user is gazing at the same focus area.

At the next step 55, whether the gazing count of the focus area X has reached a predetermined value is examined, and if it reaches the predetermined value, a shift is made to a step 56, where it is determined that the anticipation servo auto focus operation is impossible, and at a step 53, the focus area X is selected.

Although the focus area X cannot be selected by the judgment based on focus detection information, a high regard is paid to the fact that the user is gazing at that focus area many times on end, and that focus area is selected even by determining that the anticipation servo auto focus operation is impossible.

If, at the step 55, the gazing count of the focus area X is less than the predetermined value, by way of a terminal B, the program branches off to the step 44 of the subroutine "focus area selection at anticipation servo auto focus operation", where focus area selection not based on the line of sight is executed.

The focus area selection by the above-described line of sight anticipation servo auto focus operation may be briefly summed up as follows.

(1) If a focus area selected by the line of sight position is O.K. for focus detection and there is a continuity in the moving amount of the imaging plane thereof, that focus area is selected.

(2) If there is not the continuity of the moving amount of the imaging plane between a focus area presently selected on the basis of the line of sight position and a focus area previously selected, a focus area in which there is the continuity of the moving amount of the imaging plane is-selected.

(3) However, if the user is repetitively gazing at one and the same focus area on end, it is considered that the main object has changed over, and that focus area is selected and it is determined that the anticipation servo auto focus operation is impossible.

By effecting such control, it is possible to change over the focus area appropriately and continue the servo auto focus operation even if, as in the examples of FIGS. 5A, 5B and 7, the main object Q moves in the image field during the servo auto focus operation.

A mark EP in FIGS. 5A and 5B represents the coordinates of the user's line of sight in the photographing image field.

In FIG. 5A, the user gazes at the object Q and along therewith, the right focus area is selected and the servo auto focus operation is executed.

In FIG. 5B, assuming that the object Q has moved to the left in the image field, when the moving amount of the imaging plane is smoothly changing as shown in FIG. 7, it is possible to change over the focus area to the left focus area even by focus information alone as described in connection with the subroutine "focus area selection at anticipation servo auto focus operation", but the moving amount of the imaging plane observed in reality considerably contains an error and the changeover is often not effected correctly. In such a case, if the user is gazing at the main object like the mark EP in FIG. 5B, it will become possible to change over the focus area to the left on the basis of the line of sight position.

According to the present embodiment, the design is made such that if, in the servo auto focus operation, not depending on only the reliability based on the current focus state of a focus area selected by the line of sight, the change in the focus state of that focus area is examined and in that focus area, the focus state is shifting exactly as a moving object, it is judged that the user's line of sight is gazing at the main object which is a moving object, and the control of focus adjustment is changed over to that focus area. Therefore, it does not happen that the focus area changes over in conformity with the unconscious movement of the user's line of sight, and a servo auto focus operation better in the property of following the object becomes possible.

The focus detection system of the present embodiment is a phase difference detection system which can detect the focuses of three areas in the image field as shown in FIG. 3, whereas of course, the present invention is not restricted to such a focus detection system, but the present invention is also effective for a form having three or more focus detection areas at the right and left, or a form having focus detection areas in a vertical direction as well, or even if the focus detection system is of the contrast detection type.

Also, in the above-described embodiment, the design is made such that the determination of the continuity of the moving amount of the imaging plane as the ground for selecting the focus area is made only during the so-called "moving object anticipation servo auto focus operation", but the design may also be made such that a determination is made during the ordinary "servo auto focus operation" as well.

Also, the operation expressions paying attention to the difference in or the ratio of the moving speed as the determination criterion for determining the continuity of the moving amount of the imaging plane have been described above, whereas the operation expressions are not restricted thereto, but use may be made of any conditional expression if it is a determination criterion which can determine the continuity.

Also, the present embodiment has been described with respect to a case wherein the present invention is applied to a single-lens reflex camera, but the present invention is also applicable to cameras such as lens shutter cameras and video cameras. Further, the present invention is also applicable to optical apparatuses provided with the line of sight detecting function and the focus detecting function.

As described above, according to the present embodiment, the design is made such that in the so-called servo auto focus operation wherein line of sight detecting means, focus detecting means, selecting means, calculating means and driving means are repetitively operated, dependence is placed not only on the present reliability of an area selected as a result of line of the sight detection, but at least one of a plurality of areas is selected with the continuity of the past focus state of that area taken into account and the control of focus adjustment is changed over to that area.

Consequently, the focus detection area can be prevented from changing over in conformity with the unconscious movement of the observer's line of sight, and control always focused on the object of focus detection, which is a moving object, can be effected.

What is claimed is:

1. An apparatus having a line of sight detection device, said apparatus comprising:

(a) a line of sight detection device which detects a user's line of sight;

(b) a focus detection device, which outputs a result of a focus detection as focus detection information, and is capable of performing a focus detection operation in a plurality of focus detection areas;

(c) a selection circuit which selects a specific focus detection area from among the plurality of focus detection areas on the basis of the line of sight detection by said line of sight detection device;

(d) a control circuit which causes said focus detection device to repeatedly perform the focus detection operation for at least the specific focus detection area, to obtain the focus detection information from the specific focus detection area, consecutively;

(e) a judging circuit which judges a reliability of the specific focus detection area by detecting a continuous change of focusing state of the specific focus detection area from the consecutively obtained focus detection information; and (f) a determination circuit which determines whether the selection of the specific focus detection area should be maintained on the basis of the reliability judged by said judging circuit and a history of the selection of the specific focus detection area selected by said selection circuit.

2. An apparatus according to claim 1, wherein said determination circuit determines that the selection of the specific focus detection area should not be maintained when said judging circuit judges that the reliability of the focus detection at the specific focus detection area is low and the selection history of said selection circuit has not continuously been the same.

3. An apparatus according to claim 1, wherein said determination circuit determines that the selection of the specific focus detection area should not be maintained when the selection history of said selection circuit is not continuously the same and the focus detection is not possible at the specific focus detection area selected by said selection circuit.

4. An apparatus according to claim 1, wherein said determination circuit, regardless of the reliability of the selection of the specific focus detection area judged by said judging circuit, maintains the selection of the specific focus detection area when the history of the selection by said selection circuit has continuously been the same.

5. An apparatus according to claim 1, wherein said determination circuit, even if a focus detection operation is not possible at the specific focus detection area, maintains the selection of the specific focus detection area when the history of the selection by said selection circuit has continuously been the same.

6. An apparatus according to claim 1, wherein said judging circuit detects a continuous change of the focusing state based on a continuous change of a defocus amount.

7. An apparatus having a line of sight detection device, said apparatus comprising:

(a) a line of sight detection device which detects a user's line of sight;

(b) a focus detection device which is capable of performing a focus detection operation in a plurality of focus detection areas;

(c) a selection circuit which selects a specific focus detection area from among the plurality of focus detection areas on the basis of the line of sight detected by said line of sight detection device;

(d) a judging circuit which detects a continuous change of the focusing state at the specific focus detection area based on past focus detection results performed at least in the specific focus detection area and judges a reliability of the specific focus detection area based on the continuous change of focusing state in the specific focus detection area; and (e) a determination circuit which determines whether the selection of the specific area should be maintained on the basis of the reliability of the specific focus detection area judged by said judging circuit and a history of the selection of the specific focus detection area by said selection circuit.

8. An apparatus according to claim 7, wherein said determination circuit determines that the selection of the specific focus detection area should not be maintained when said judging circuit judges that the reliability of the focus detection at the specific focus detection area is low and the selection history of said selection circuit has not continuously been the same.

9. An apparatus according to claim 7, wherein said determination circuit determines that the selection of the specific focus detection area should not be maintained when the selection history of said selection circuit is not continuously the same and the focus detection is not possible at the specific focus detection area selected by said selection circuit.

10. An apparatus according to claim 7, wherein said judging circuit detects a continuous change of the focusing state based on a continuous change of a defocus amount.

11. An apparatus having a line of sight detection device, said apparatus comprising:

(a) a line of sight detection device which detects a user's line of sight;

(b) a focus detection device which is capable of performing a focus detection operation in a plurality of focus detection areas, said focus detection device performing the focus detection operation in the plurality of focus detection areas prior to said line of sight detection device detecting the line of sight; and (c) a selection circuit which selects a specific focus detection area from among the plurality of focus detection areas on the basis of the line of sight detected by said line of sight detection device and the result of the focus detection performed by said focus detection device, wherein said selection circuit obtains a change of a focusing state in the plurality of focus detection areas based on the result of the focus detection by said focus detection device and selects a focus detection area whose focusing state is continuously changing and which corresponds with the line of sight detected by said line of sight detection device as the specific area.

12. An apparatus according to claim 11, wherein said selection circuit obtains a change in the focus state in the plurality of focus detection areas from the result of the focus detection by said focus detecting device, and selects a focus detection area in which the focus state is continuously changing and which corresponds to the line of sight detected by said line of sight detection device, as the specific focus detection area.

* * * * *

UNITED STATES PATENT AND TRADEMARK OFFICE
CERTIFICATE OF CORRECTION

PATENT NO. : 5,721,967                         Page 1 of 2
DATED      : February 24, 1998
INVENTOR(S) : AKIRA AKASHI It is certified that error appears in the above-identified patent and that said Letters Patent is hereby corrected as shown below:

IN THE DRAWINGS

FIGURE 10:

In "step S36", "MOST" should be deleted.

FIGURE 11:

In "step S44, "MOST" should be deleted.

COLUMN 1:

Line 11, "of line of the" should read --of the line of--.

COLUMN 6:

Line 10, "stores into it" should read --stores it into--.

COLUMN 7:

Line 63, "at" should be deleted.

UNITED STATES PATENT AND TRADEMARK OFFICE
CERTIFICATE OF CORRECTION

PATENT NO. : 5,721,967
DATED : February 24, 1998
INVENTOR(S) : AKIRA AKASHI

It is certified that error appears in the above-identified patent and that said Letters Patent is hereby corrected as shown below:

COLUMN 11:

Line 22, "is-selected." should read --is selected.--.

COLUMN 12:

Line 35, "line of the" should read --the line of--.

Signed and Sealed this

Fifteenth Day of September, 1998

Attest:

BRUCE LEHMAN

*Attesting Officer*      *Commissioner of Patents and Trademarks*